July 31, 1923.
W. N. KOGER
STREET CLEANING MACHINE
Filed May 4, 1920
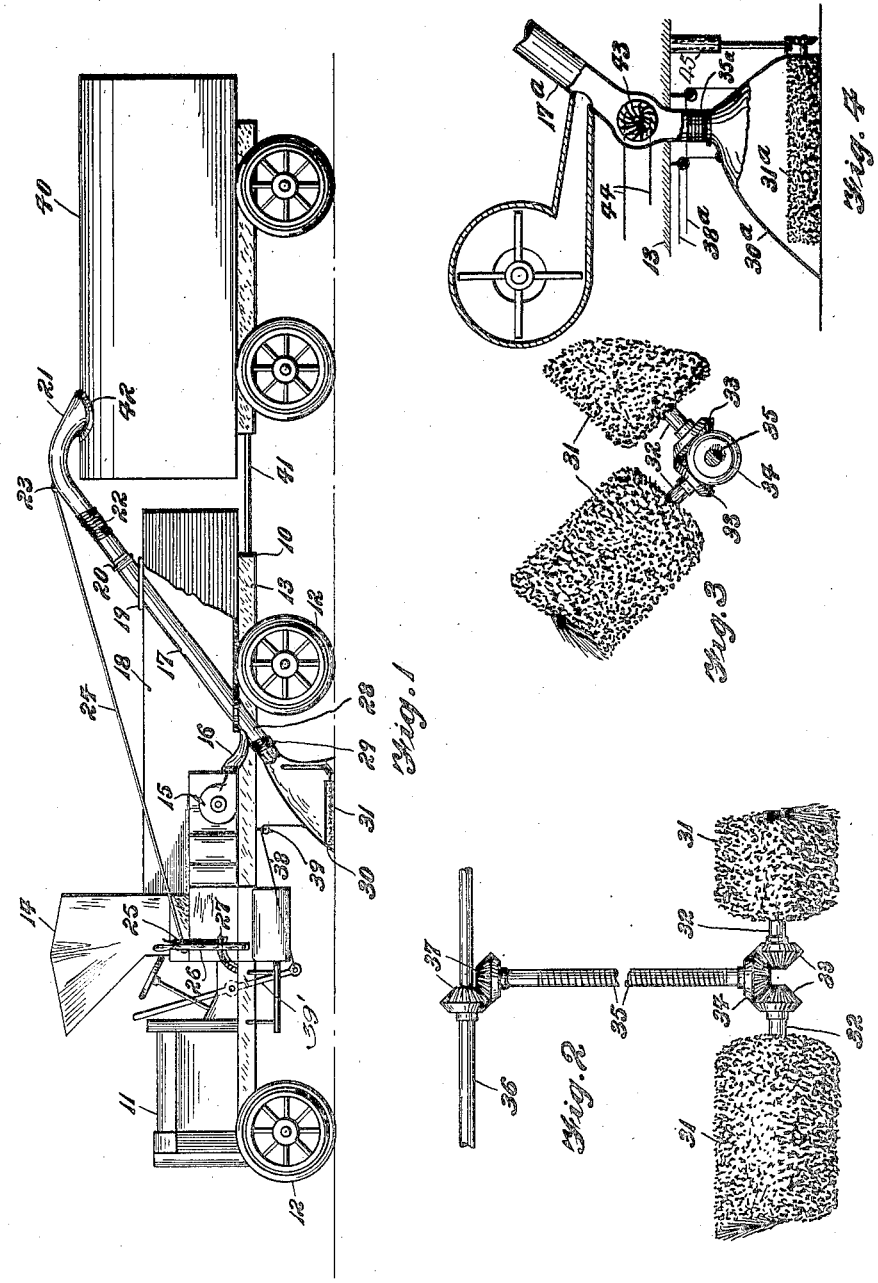

Patented July 31, 1923.

1,463,707

UNITED STATES PATENT OFFICE.

WESLEY N. KOGER, OF PHILADELPHIA, PENNSYLVANIA.

STREET-CLEANING MACHINE.

Application filed May 4, 1920. Serial No. 378,887.

*To all whom it may concern:*

Be it known that I, WESLEY N. KOGER, a citizen of the United States, residing at Philadelphia, in the county of Philadelphia and State of Pennsylvania, have invented new and useful Improvements in Street-Cleaning Machines, of which the following is a specification.

This invention relates to street cleaning machines and it has more particular reference to machines of the self-propelled type which are provided with apparatus for collecting or gathering up the sweepings as the cleaning operation proceeds.

The main object of this invention is to provide a self-propelled street cleaning machine with which is associated a collector and ejector apparatus for the sweepings, said ejector apparatus being adapted to dump or feed the sweepings into a trailer wagon or wagons which can be readily detached and transported to a destructor plant.

A further object of this invention is to provide a self-propelled street cleaning machine which can be moved from place to place with the cleaning devices proper raised to inoperative position.

Still further my invention aims to provide a street cleaning machine which is simple in construction, easy to operate, not liable to get out of order, and reliable and durable in action.

With the foregoing objects in view this invention consists essentially in the novel features of construction, combination and arrangement of parts hereinafter fully described and more specifically defined by the appended claim.

In the further disclosure of the invention reference is to be had to the accompanying sheet of explanatory drawings constituting a part of this specification and in which like characters of reference designate the same or similar parts in all the views.

Figure 1 is an elevation of a street cleaning machine embodying my invention with parts broken away or in section to better disclose the underlying structure.

Figure 2 is an enlarged fragmentary detail of the sweeper mechanism proper.

Figure 3 is a plan of the same; and

Figure 4 is a fragmentary detail of a slightly modified form of the invention.

Referring to the views the numeral 10 designates a motor vehicle which is adapted for self-propulsion by an internal combustion engine 11, of approved type, said vehicle being mounted on road wheels 12. Mounted on the chassis 13, preferably in the rear of the driver's seat and hood 14, is a blowing engine or fan 15 provided with a discharge pipe 16 communicating with an obliquely disposed conduit 17 supported in the truck body 18 in any convenient manner—for example by a cross beam or plate bridge 19 secured on the top of the side walls of said body 18. It is also to be noted that this conduit 17 is rearwardly inclined at its upper end and that it has attached thereto at 20, a cowl 21, which is fitted intermediate its ends with a flexible section 22 for the purpose hereafter explained. Hinged to the cowl 21 at 23, is a connecting rod 24 in turn pivoted at its remote end 25 to a hand lever 26 mounted on the chassis 13 convenient to the driver's seat 14, a quadrant and locking mechanism 27 being provided for holding the lever 26 in the desired position.

Attached to the lower end of the conduit 17 is an extension 28 having a flexible section 29 and terminating in a hood 30 which is adapted to enclose and house a pair of street sweeping brushes 31 carried by shafts 32 in any of the well known ways, said shafts converging together and being fitted with mitre gears 33, in turn meshing with a bevel gear 34 at the lower end of a vertical flexible shaft 35, conveniently driven from the main shaft 36 (Figure 2) of the engine 11 through mitre gears 37. Connected to the hood 30 is a chain or cable 38 which passes over a guide roller 39 and is under the control of the driver so that said hood 30 and the brushes 31 can be raised from contact with the street or road surface as and when desired—any appropriate mechanism being employed for effecting this raising and lowering operation but is shown in this instance by means of a pivoted hand lever 39'.

An ordinary refuse trailer or garbage wagon 40 is removably connected at 41 to the chassis 13 and it will be seen that the cowl 21 is adapted to seat thereon by means of a flexible or flanged lip 42 so that escape of the sweepings is prevented and cleanliness in operation insured.

In some instances I may prefer to employ the mechanism shown in Figure 4, and which consists essentially in fitting in the lower end of the conduit 17ª, a small fan 43, conveniently driven by a belt 44 from the blowing engine 15, said fan 43 materially assisting in raising heavy matter disturbed and swept-up by the brushes 31ª, and directing same into the full force of the current of air blowing from the engine 15 upwardly through the conduit 17. It is also to be noted that in this case I preferably make the flexible section 35ª of a collapsible or bellows nature so that the hood 30ª, can be raised directly vertical by means of appropriate chains or cables 38ª under the control of the driver as hereinbefore set forth, and in order to effectively ensure this operation, I substitute for the flexible shaft 35 a telescopic shaft 45.

In using the machine hereinbefore described a garbage wagon 40, is first attached to the truck or motor vehicle 10 and the cowl 21 lowered into position thereon, whereupon the motor 11 and blower 15 are started up and the cleaning operation commences. The dirt and refuse broken and swept together by the brushes 31 will be sucked upwards and forced through the conduit 17 and ejected into the wagon 40 which when full, can be readily detached from the truck 10 and be replaced by another empty one, it of course being clearly understood that the driver of said truck first raises the cowl 21 by manipulating the hand lever 26. Furthermore it will be clearly seen that when the machine is to be moved out to a street, alley or boulevard, where it is to be used for cleaning purposes, the brushes 31 and hood 30 are first raised by exerting the necessary pull upon the chains or cables 38 to lift said brushes and hood clear of the road surface whereupon the vehicle 10 can be moved under its own power as an ordinary truck.

Whilst I have shown and described a preferred construction of my invention, I wish it clearly understood that I do not limit myself to the precise details but consider myself at liberty to make such changes and other combinations as may reasonably be construed as falling within the scope and ambit of the appended claim.

Having described my invention what I claim as new and desire to secure by Letters Patent, is:—

A street cleaning machine comprising a vehicle, a conduit passing through the rear end of the vehicle and being obliquely disposed with its upper end rearwardly inclined, an extension secured to the lower end of the conduit, a blower mounted for operation on the chassis of the vehicle, a discharge pipe establishing communication between the blower and the conduit through the medium of the extension, a hood flexibly secured to the extension, a flexible shaft mounted for rotation in said hood, a pair of converging brushes rotated from the flexible shaft, means for raising or lowering the flexible shaft and the hood simultaneously and a rotary fan carried in the lower end of the conduit as and for the purpose specified.

In testimony whereof, I affix my signature.

WESLEY N. KOGER.